(12) United States Patent
Govindaraju et al.

(10) Patent No.: US 9,244,669 B2
(45) Date of Patent: Jan. 26, 2016

(54) DEPLOYING AN APPLICATION ACROSS MULTIPLE DEPLOYMENT ENVIRONMENTS

(71) Applicant: VMWARE, INC., Palo Alto, CA (US)

(72) Inventors: Agila Govindaraju, Bangalore (IN); Kiran Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/453,644

(22) Filed: Aug. 7, 2014

(65) Prior Publication Data

US 2015/0378702 A1    Dec. 31, 2015

(30) Foreign Application Priority Data

Jun. 26, 2014   (IN) .......................... 3118/CHE/2014

(51) Int. Cl.
*G06F 9/445* (2006.01)
(52) U.S. Cl.
CPC .... *G06F 8/60* (2013.01); *G06F 8/61* (2013.01)
(58) Field of Classification Search
CPC ...................................................... G06F 8/61
USPC ........................................................ 717/177
See application file for complete search history.

(56) References Cited

U.S. PATENT DOCUMENTS

2012/0239825 A1* 9/2012 Xia et al. ...................... 709/250
2012/0266168 A1* 10/2012 Spivak et al. ..................... 718/1
2013/0232463 A1  9/2013 Nagaraja et al.
2013/0232480 A1* 9/2013 Winterfeldt et al. .......... 717/177
2013/0232497 A1  9/2013 Jalagam et al.
2013/0232498 A1  9/2013 Mangtani et al.
2014/0007079 A1* 1/2014 Whitney et al. ............... 717/176

OTHER PUBLICATIONS

"VMware vFabric Application Director (Datasheet)"; VMware.com website; May 1, 2012.*
"Using VMware vFabric Application Director (Manual)"; VMware.com website; Mar. 16, 2012.*
"Cloud Computing"; Wikipedia.org website; Jun. 25, 2014.*
VMware, Inc., "Using VMware vCloud Application Director: vCloud Application Director 6.0," EN-001246-00, 2014, 226 pages.

* cited by examiner

*Primary Examiner* — Qing Chen
*Assistant Examiner* — Clint Thatcher

(57) ABSTRACT

Disclosed examples to configure an application for deployment across a plurality of deployment environments involve displaying a user-selectable control in a user interface. The user-selectable control is to specify whether the application is to be deployed across the plurality of deployment environments. Based on selection of the user-selectable control, a blueprint of the application stores an indication of whether the application is to be deployed across the plurality of deployment environments. Based on the indication in the blueprint, an application deployment profile is generated to specify the plurality of deployment environments across which to deploy the application.

23 Claims, 8 Drawing Sheets

BLUEPRINT EDITOR
GRAPHICAL USER INTERFACE

DEPLOYMENT PROFILE GENERATOR
GRAPHICAL USER INTERFACE

APPLICATION DEPLOYER
GRAPHICAL USER INTERFACE

```
CREATE TABLE blueprint
(
  id serial NOT NULL,
  revision integer DEFAULT 0,
  "name" character varying(255) NOT NULL,
  description character varying(1024),
  inactive boolean DEFAULT false,
  same_environment boolean DEFAULT true,
  lock_version integer NOT NULL DEFAULT 1,
  last_updated timestamp without time zone NOT NULL DEFAULT now(),
  last_update_user character varying(255) NOT NULL DEFAULT 'SYSTEM'::character varying,
  created timestamp without time zone NOT NULL DEFAULT now(),
  create_user character varying(255) NOT NULL DEFAULT 'SYSTEM'::character varying,
  CONSTRAINT blueprint_pkey PRIMARY KEY (id)
)
```

500

502 → same_environment boolean DEFAULT true,

FIG. 5

```
CREATE TABLE deployment_profile_pnode
(
deployment_profile_id integer NOT NULL,
profile_node_id integer NOT NULL,
deployment_environment_id integer,          ← 602
CONSTRAINT deployment_profile_pnode_deployment_profile_id_fkey FOREIGN KEY (deployment_profile_id)
REFERENCES deployment_profile (id) MATCH SIMPLE
ON UPDATE NO ACTION ON DELETE NO ACTION,
CONSTRAINT deployment_profile_pnode_profile_node_id_fkey FOREIGN KEY (profile_node_id)
REFERENCES profile_node (id) MATCH SIMPLE
ON UPDATE NO ACTION ON DELETE NO ACTION,
CONSTRAINT uk_deployment_profile_pnode UNIQUE (profile_node_id, deployment_profile_id)
)
```

DEPLOYING AN APPLICATION ACROSS MULTIPLE DEPLOYMENT ENVIRONMENTS

RELATED APPLICATIONS

Benefit is claimed under 35 U.S.C. 119(a)-(d) to Foreign application Serial No. 3118/CHE/2014 filed in India entitled "DEPLOYING AN APPLICATION ACROSS MULTIPLE DEPLOYMENT ENVIRONMENTS", filed on Jun. 26, 2014, by VMware, Inc., which is herein incorporated in its entirety by reference for all purposes.

FIELD OF THE DISCLOSURE

The present disclosure relates generally to cloud computing and, more particularly, to deploying an application across multiple deployment environments.

BACKGROUND

In cloud computing design, numerous tools exist to create and deploy applications in cloud environments. For example, application provisioning tools facilitate cloud computing designers to create and standardize application deployment topologies on infrastructure clouds. Some application provisioning tools include graphical user interfaces (GUIs) that enable designers to generate application deployment topologies called application blueprints, which define structures and configurations of applications. Some applications include multiple nodes corresponding to different aspects of the application. Application provisioning tools enable deploying an application onto any selected one of a number of cloud environments. However, when a cloud environment is selected in an application provisioning tool, all nodes of the application are deployed on the same cloud environment. As such, prior application provisioning tools allow designers to deploy an application in a particular cloud environment based on the application blueprint such that all nodes of that application are deployed in the same cloud environment.

BRIEF DESCRIPTION OF THE DRAWINGS

FIG. 5 depicts an example listing of programming instructions that may be used to generate machine readable instructions executable by a computer to generate a blueprint table for an example blueprint of FIG. 1.

FIG. 6 depicts an example listing of programming instructions that may be used to generate machine readable instructions executable by a computer to store deployment environment details for an example deployment profile of FIG. 1.

DETAILED DESCRIPTION

Figure 1:
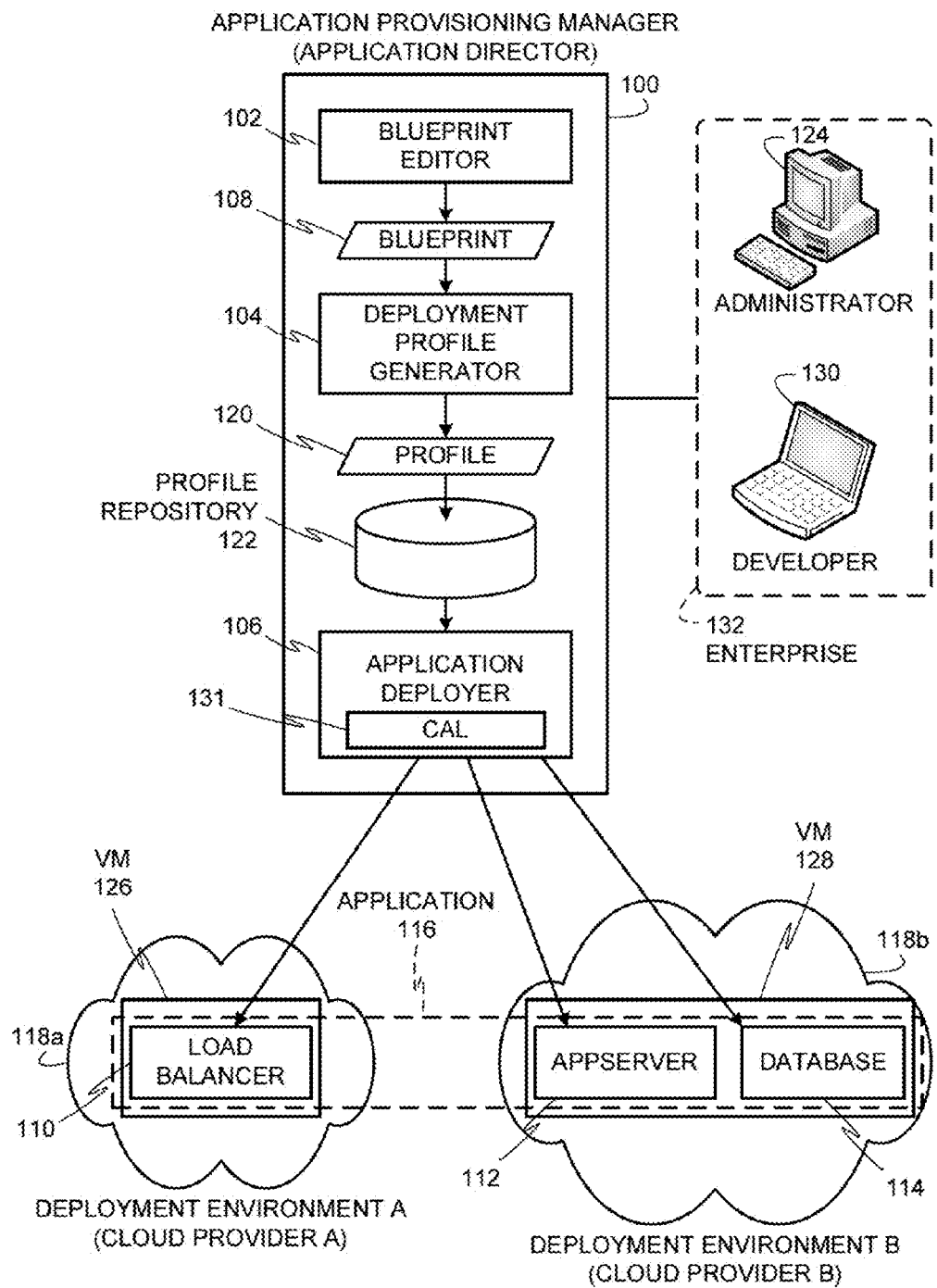
FIG. 1 depicts an example application provisioning manager to generate application deployment profiles based on user-designed blueprints to deploy nodes of an application across multiple deployment environments.

Prior application provisioning managers enable designing applications by dragging and dropping different components of an application in a graphical user interface (GUI) of a blueprint editor. In this manner, designers of cloud-deployable applications can create blueprints that can be subsequently used one or more times to deploy instances of the same application in numerous deployment environments. That is, a blueprint designed using such a prior application provisioning manager can be used to deploy a first instance of an application, in its entirety (i.e., all nodes of the application), in a first physical cloud environment, and deploy a second instance of the application, in its entirety, in a second physical cloud environment. However, such prior application provisioning managers allow selecting only one deployment environment/cloud provider for a given blueprint defining an application. Such prior application provisioning managers do not allow configuring a blueprint for use in deploying different nodes of an application across multiple deployment environments/cloud environments.

Examples disclosed herein enable configuring a blueprint to deploy different nodes of an application across multiple deployment environments (e.g., different deployment environments of the same cloud provider or of different cloud providers). For example, a multi-tier application having an application server node and a database node may require the application server node to be deployed in a public cloud (e.g., Amazon Web Services ("AWS") or any other suitable public cloud service), and the database node to be deployed in a private cloud (e.g., an enterprise cloud based on VMware vSphere® Platform or any other suitable private cloud platform). Using examples disclosed herein, designers of cloud-deployable applications can design blueprints to deploy nodes of an application across multiple deployment environments.

Examples disclosed herein may be used to configure an application for deployment across a plurality of deployment environments. Examples disclosed herein involve displaying a user-selectable control in a user interface. In examples disclosed herein, the user-selectable control is to specify whether the application is to be deployed across the plurality of deployment environments. In examples disclosed herein, based on a selection of the user-selectable control, a blueprint of the application stores an indication of whether the application is to be deployed across the plurality of deployment environments. In examples disclosed herein, based on the indication in the blueprint, an application deployment profile is generated to specify the plurality of deployment environments across which to deploy the application.

In some examples disclosed herein, the application deployment profile is stored in a memory, and the application deployment profile is useable at a deployment time to deploy the application across the plurality of deployment environments.

In some examples disclosed herein, the application deployment profile is to specify the plurality of deployment environments across which to deploy the application by specifying that a first node of the application is to be deployed in a first one of the plurality of deployment environments and that a second node of the application is to be deployed in a second one of the plurality of deployment environments.

In some examples disclosed herein, at a deployment time, configuration information is obtained to provision virtual machines in the plurality of deployment environments across which the application is to be deployed, and the application is deployed across the plurality of deployment environments based on the application deployment profile and the configuration information.

In some examples disclosed herein, the configuration information includes a mapping between a logical template and a physical template. In such some examples, the logical template specifies a virtual computing resource for one of the virtual machines, and the physical template includes metadata that describes a physical configuration of the one of the virtual machines.

In some examples disclosed herein, displaying the user-selectable control in the user interface comprises displaying the user-selectable control in association with the blueprint of the application.

In some examples disclosed herein, the application deployment profile indicates that a first node of the application is to be deployed in one of the deployment environments that is a public network, and a second node of the application is to be deployed in another one of the deployment environments that is a private network.

FIG. 1 depicts an example application provisioning manager 100 (e.g., an application director) to generate application deployment profiles based on user-designed blueprints to deploy nodes of an application across multiple deployment environments (e.g., different deployment environments of the same cloud provider or of different cloud providers). In the illustrated example, the example application provisioning manager 100 includes an example blueprint editor 102, an example deployment profile generator 104, and an example application deployer 106. The example blueprint editor 102 is provided to receive user inputs and generate an example application blueprint 108 (e.g., a user-designed application blueprint) that is based on a user-specified configuration indicating whether nodes (e.g., an example load balancer node 110, an example application server (appserver) node 112, and an example database node 114) of an example application 116 are to be deployed in the same deployment environment or are to be deployed across multiple deployment environments (e.g., the example deployment environments A 118a and B 118b). The example deployment profile generator 104 is provided to generate an example deployment profile 120 (e.g., an application deployment profile) based on the example nodes 110, 112, 114 of the example application 116 specified in the application blueprint 108 by selecting deployment environments (e.g., the example deployment environments A 118a and B 118b) in which the example nodes 110, 112, 114 are to be deployed.

In the illustrated example, the application provisioning manager 100 also includes an example profile repository 122 to store deployment profiles such as the example deployment profile 120 for subsequent use at deployment time (e.g., a deployment phase) to deploy, for example, the application 116. The example profile repository 122 may be implemented using any suitable memory (e.g., the random access memory 814 of FIG. 8, the local memory 813 of FIG. 8, the mass storage memory 828 of FIG. 8, etc.) to store computer readable data. In some examples, the profile repository 122 is separate from the application provisioning manager 100.

Applications, such as the application 116 of FIG. 1, are often developed using a multi-tier architecture in which functions such as presentation, application processing, and data management are logically separate components. For example, an enterprise's custom banking application that has a multi-tier architecture may use a cluster of application servers (e.g., JBoss Application Servers) to execute in a scalable runtime environment, a relational database management system (e.g., MySQL) to store account data, and a load balancer to distribute network traffic for robustness. To deploy such a multi-tier application, a developer, who understands the architecture of the application, must coordinate with a system administrator, who controls access to computing resources, to determine which computing resources (e.g., computing, networking, and storage) and software services (e.g., software packages) should be provisioned to support execution of the application.

Blueprints, such as the application blueprint 108, define the structure of an application, enable the use of standardized application infrastructure components, and specify installation dependencies and default configurations. Blueprints define the topology for deployment in an infrastructure-agnostic manner to be portable across different cloud computing environments. The application blueprint 108 may be assembled out of items from a catalog (not shown), which is a listing of available virtual computing resources (e.g., virtual machines (VMs), networking, storage, etc.) that may be provisioned by cloud computing platform providers (e.g., one or more cloud providers of the deployment environments 118a, 118b) and available application components (e.g., software services, scripts, code components, application-specific packages) that may be installed on the provisioned virtual computing resources. An administrator 124 (e.g., IT or system administrator) may pre-populate and customize a catalog by entering specifications, configurations, properties, and other details about each item in the catalog. The application blueprint 108 may define one or more dependencies between application components to indicate an installation order of the application components during deployment. For example, since a load balancer usually cannot be configured until a web application is up and running, the application blueprint 108 may specify a dependency from an Apache service to an application code package.

In the illustrated examples, the example deployment profile 120 for the example application 116 is generated using the example application blueprint 108 described above. In some examples, the example deployment profile 120 is separated and distributed as local deployment plans having a series of tasks to be executed by virtual machines provisioned from a cloud computing environment. Each virtual machine coordinates execution of each task with a centralized deployment module to ensure that tasks are executed in an order that complies with dependencies specified in the example application blueprint 108. In the illustrated example of FIG. 1, the load balancer node 110 runs on an example VM 126 in the deployment environment A 118a, and the appserver node 112 and the database node 114 run on an example VM 128 in the deployment environment B 118b. The VM 126 of the illustrated example is configured based on the deployment profile 120 to coordinate execution of tasks to deploy the load balancer node 110 to run in the deployment environment A 118a. The VM 128 of the illustrated example is configured based on the deployment profile 120 to coordinate execution of tasks to deploy the appserver node 112 and the database node 114 to run in the deployment environment B 118b. Although the appserver node 112 and the database node 114 are shown running on the same VM 128, in other examples, separate VMs in the deployment environment B 118b may be provided to run the appserver node 112 and the database node 114.

The example application deployer 106 is provided to define network configuration details for the example deployment profile 120 at deployment time. For example, when a developer 130 is ready to deploy the application 116 across the deployment environments 118a, 118b, the developer 130 can define network mapping details as discussed below in connection with FIG. 4. In the illustrated examples, network mapping details enable cloud environments to configure virtual machines for hosting the nodes 110, 112, 114 of the application 116. The example application deployer 106 is provided with an example cloud abstraction layer (CAL) module 131 that communicates network mapping details and configuration information to target cloud providers (e.g., cloud providers of the deployment environments 118a, 118b) to provision the VMs that are to host the nodes 110, 112, 114 of the application 116.

In the illustrated example, the application provisioning manager 100 (e.g., an application director) runs in one or more VMs. The application provisioning manager 100 of the illustrated example may be used by the developer 130 of an enterprise 132 to configure and deploy the application 116 across the deployment environments 118a, 118b. For example, the developer 130 may interact with the blueprint editor 102 to create the application blueprint 108, may interact with the deployment profile generator 104 to create the deployment profile 120, and may interact with the application deployer 106 to define network configuration details to deploy the application 116.

While an example manner of implementing the application provisioning manager 100 is illustrated in FIG. 1, one or more of the elements, processes and/or devices illustrated in FIG. 1 may be combined, divided, re-arranged, omitted, eliminated and/or implemented in any other way. Further, the example blueprint editor 102, the example deployment profile generator 104, the example application deployer 106, the example CAL module 131 and/or, more generally, the example application provisioning manager 100 of FIG. 1 may be implemented by hardware, software, firmware and/or any combination of hardware, software and/or firmware. Thus, for example, any of the example blueprint editor 102, the example deployment profile generator 104, the example application deployer 106, the example CAL module 131 and/or, more generally, the example application provisioning manager 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example blueprint editor 102, the example deployment profile generator 104, the example application deployer 106, and/or the example CAL module 131 is/are hereby expressly defined to include a tangible computer readable storage device or storage disk such as a memory, a digital versatile disk (DVD), a compact disk (CD), a Blu-ray disk, etc. storing the software and/or firmware. Further still, the example application provisioning manager 100 of FIG. 1 may include one or more elements, processes and/or devices in addition to, or instead of, those illustrated in FIG. 1, and/or may include more than one of any or all of the illustrated elements, processes and devices.

Figure 2:
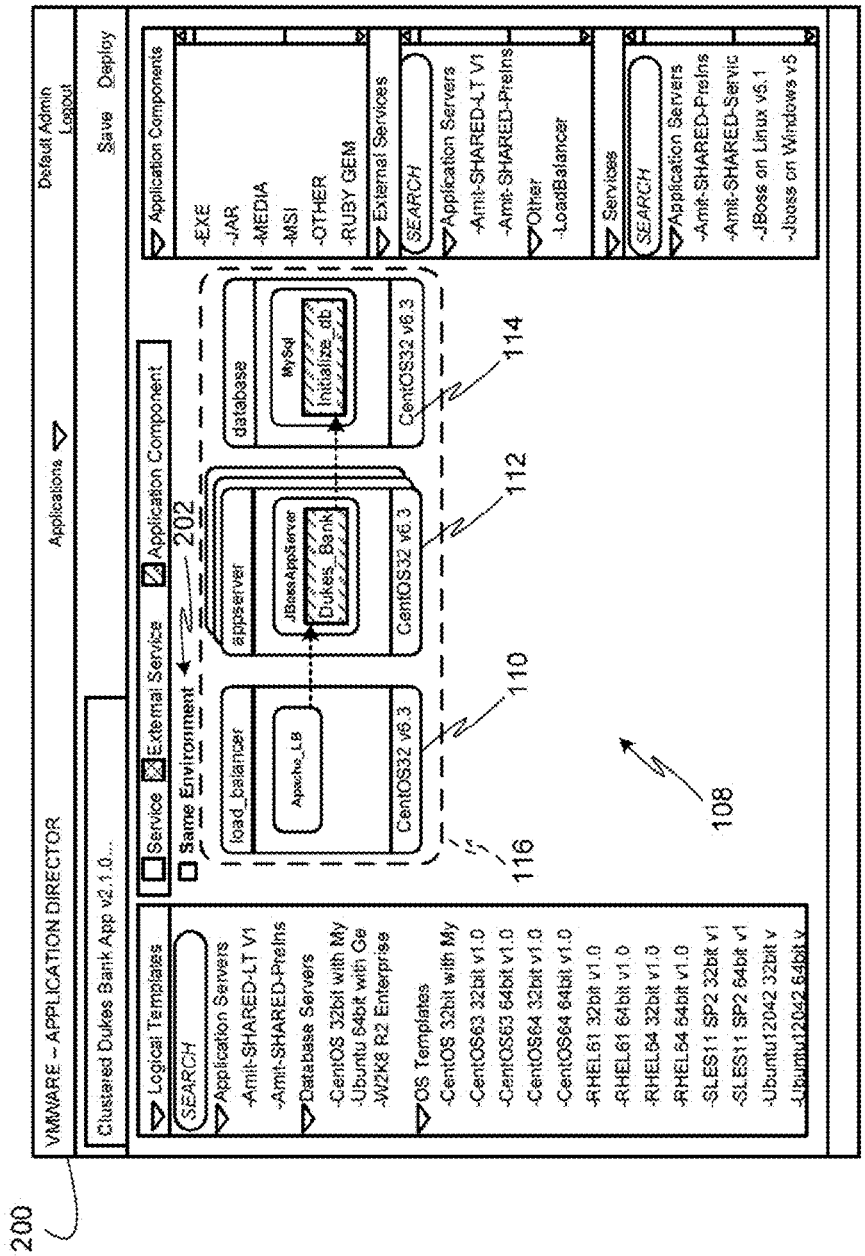
FIG. 2 depicts an example graphical user interface of a blueprint editor of FIG. 1 to facilitate specifying application deployment configurations.

FIG. 2 depicts an example blueprint editor graphical user interface (GUI) 200 of the example blueprint editor 102 of FIG. 1. The example blueprint editor GUI 200 is provided to the example blueprint editor 102 to enable users (e.g., the developer 130 of FIG. 1) to specify application deployment configurations. In the illustrated example, the blueprint editor GUI 200 shows the blueprint 108 of FIG. 1 of the application 116 of FIG. 1 that includes the load balancer node 110, the appserver node 112, and the database node 114. In the illustrated example, the blueprint editor GUI 200 is provided with a user-selectable 'Same Environment' GUI control 202 (e.g., a 'Same Environment' field) that is displayed to allow a user to specify whether the nodes 110, 112, 114 of the application 116 are all to be deployed in the same deployment environment or across multiple deployment environments.

In the illustrated example, when the 'Same Environment' GUI control 202 is selected in the example blueprint editor GUI 200 by a user, the blueprint editor 102 of FIG. 1 detects the selection (e.g., via a flag or value set to one) of the 'Same Environment' GUI control 202 and configures the blueprint 108 of the application 116 to indicate that the nodes 110, 112, 114 of the application 116 are to be deployed in the same deployment environment. For example, all of the nodes 110, 112, 114 may be deployed in the deployment environment A 118a of FIG. 1, all of the nodes 110, 112, 14 may be deployed in the deployment environment B 118b of FIG. 1, etc. In such instances, the selected deployment environment can be bound to the application 116 at the application level so that all of the nodes 110, 112, 114 of the application 116 are configured to be deployed in the same deployment environment bound to the application 116. For example, the deployment environment generator 104 can bind the selected deployment environment to the application 116 by storing an identifier of the deployment environment in a deployment environment property value of the application 116. Alternatively, the deployment environment generator 104 can bind the selected deployment environment to the application 116 by individually setting deployment environment property values of the nodes 110, 112, 114 of the application 116 to the identifier of the deployment environment.

In the illustrated example, when the 'Same Environment' GUI control 202 is not selected in the example blueprint editor GUI 200 by a user, the blueprint editor 102 of FIG. 1 detects the non-selection of the 'Same Environment' GUI control 202 and configures the blueprint 108 of the application 116 to indicate that the nodes 110, 112, 114 of the application 116 are to be deployed across multiple deployment environments. For example, one or some of the nodes 110, 112, 114 are to be deployed in the deployment environment A 118a of FIG. 1, and the remaining one(s) of the node(s) 110, 112, 114 are to be deployed in the deployment environment B 118b of FIG. 1. In such examples, binding different selected deployment environments to different ones of the nodes 110, 112, 114 at the node level enables deploying different ones of the nodes 110, 112, 114 in different deployment environments. For instance, the illustrated example of FIG. 1 shows an example deployment of the application 116 across multiple deployment environments 118a, 118b based on the 'Same Environment' GUI control 202 not having been selected in the example blueprint editor GUI 200 during a design phase of the blueprint 108. In particular, the illustrated example of FIG. 1 shows the example load balancer node 110 deployed in the example deployment environment A 118a and the example appserver node 112 and the example database node 114 deployed in the example deployment environment B 118b. As such, the example load balancer node 110 is bound at the node level to the example deployment environment A 118a, and the example appserver node 112 and the example database node 114 are bound at the node level to the example deployment environment B 118b. Other deployment configurations to deploy the application 116 across multiple deployment environments are also possible so long as at least one node of the application 116 is in a deployment environment that is separate from another deployment environment in which another node of the application 116 is deployed. In the examples disclosed herein, to bind different deployment environments (e.g., the example deployment environments 118a, 118b) to different ones of the nodes 110, 112, 114, the deployment environment generator 104 can store identifiers of the different deployment environments in corresponding deployment environment property values of the nodes 110, 112, 114.

Figure 3:
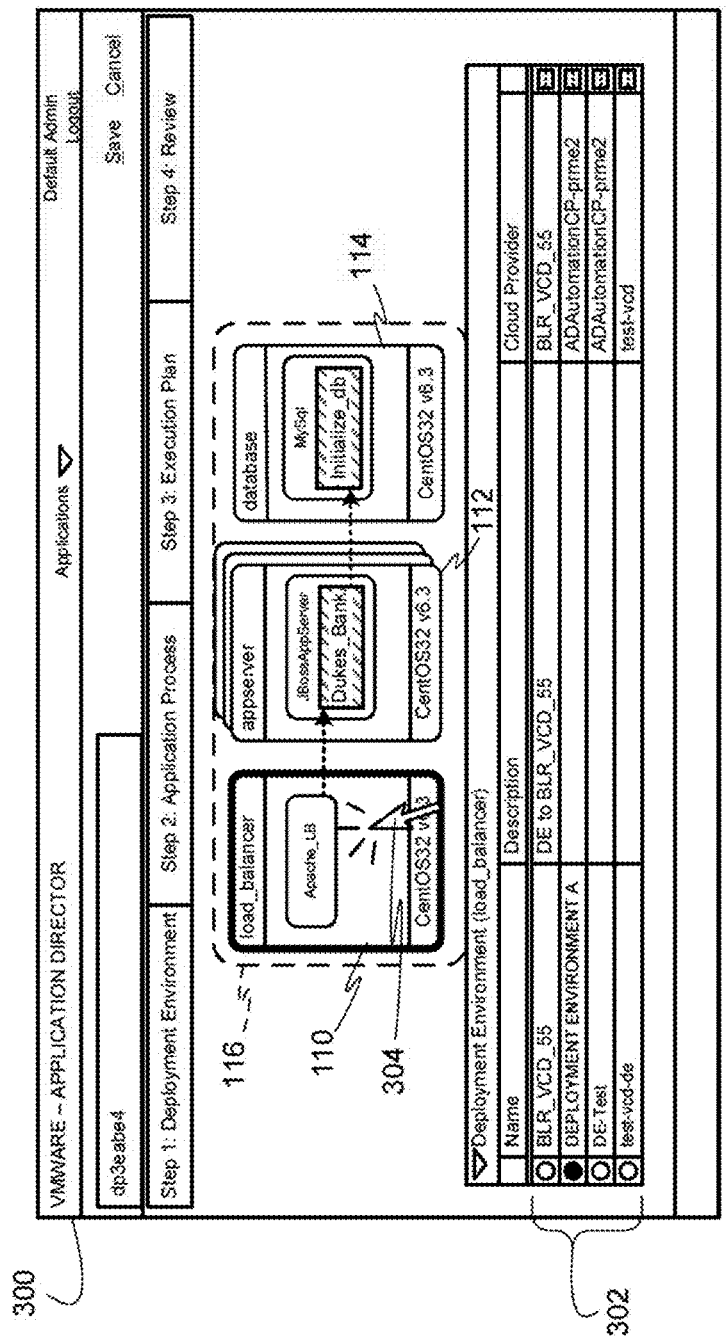
FIG. 3 depicts an example graphical user interface of a deployment profile generator of FIG. 1 to select deployment environments in which different nodes of an application are to be deployed.

FIG. 3 depicts an example deployment profile generator GUI 300 of the example deployment profile generator 104 of FIG. 1. The example deployment profile generator GUI 300 is provided to the example deployment profile generator 104 of FIG. 1 to generate the example deployment profile 120 of FIG. 1 by enabling users (e.g., the developer 130 of FIG. 1) to select example deployment environments 302 in which different ones of the example nodes 110, 112, 114 of the example application 116 are to be deployed. In the illustrated example, the profile generator GUI 300 displays the blueprint 108 of the application 116 and the nodes 110, 112, 114. When a user selects one of the example nodes 110, 112, 114 in the blueprint 108, the profile generator GUI 300 displays a listing of the example deployment environments 302 selectable by a user to specify in which one of the example deployment environments 302 the selected one of the nodes 110, 112, 114 is to be deployed. In this manner, selected deployment environments can be bound to nodes 110, 112, 114 at the node level rather than at the application level so that different ones of the nodes 110, 112, 114 can be deployed in different deployment environments. In some examples, the example deployment environments 302 may include the example deployment environments A 118a and B 118b of FIG. 1.

In the illustrated example, a human interface device pointer 304 is shown selecting the load balancer node 110. Selection of the load balancer node 110 indicates that the load balancer node 110 is to be deployed in a selected one of the example deployment environments 302 displayed in the profile generator GUI 300. In similar manner, the user may use the human interface device pointer 304 to select the appserver node 112 and specify one of the example deployment environments 302 in which to deploy the appserver node 112, and also to select the database node 114 and specify one of the example deployment environments 302 in which to deploy the database node 114. Based on user-selections received via the example profile generator GUI 300, the example deployment profile generator 104 generates the example deployment profile 120 to store the mappings between the nodes 110, 112, 114 of the example application 116 and corresponding deployment environments. In the illustrated example, the deployment profile generator 104 stores the example deployment profile 120 in the profile repository 122 (FIG. 1).

Figure 4:
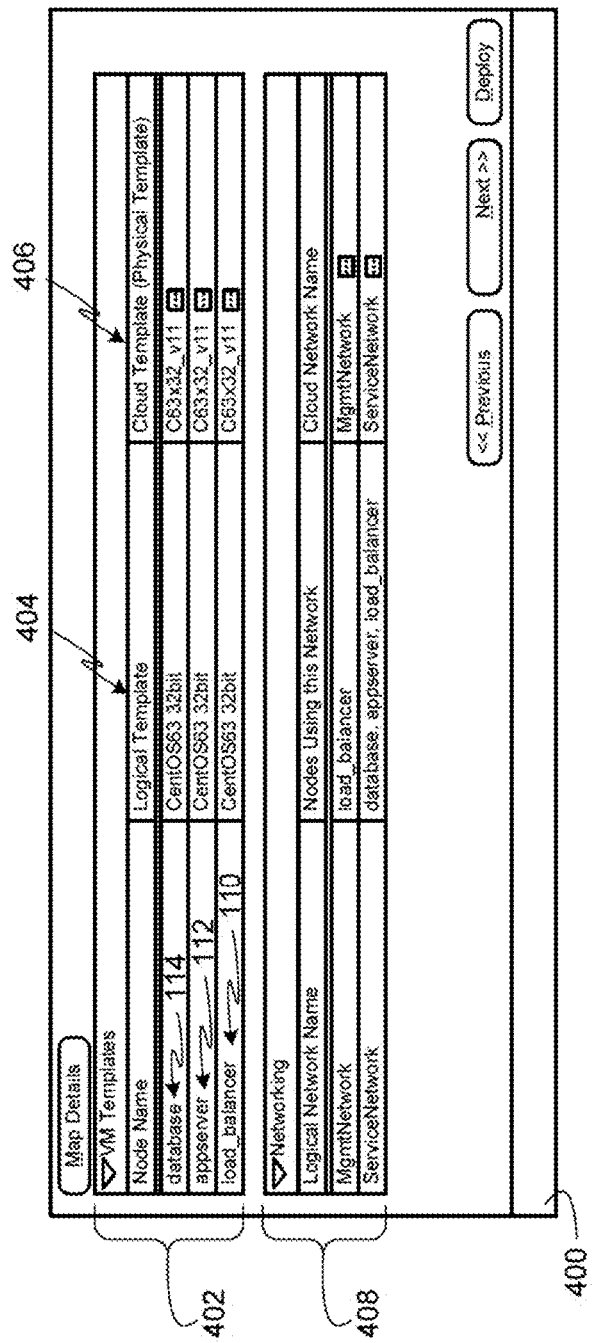
FIG. 4 depicts an example graphical user interface of an example application deployer of FIG. 1 to define mappings of logical templates to physical templates for the different nodes of an application to be deployed, and to define network configuration information for the application.

FIG. 4 depicts an example application deployer GUI 400 of the example application deployer 106 of FIG. 1. In the illustrated example, the example application deployer GUI 400 facilitates defining mappings of logical templates to physical templates for the different ones of the example nodes 110, 112, 114 (FIGS. 1-3) of the example application 116 (FIGS. 1-3) to be deployed. In the illustrated example, the example application deployer GUI 400 also facilitates defining network configurations (e.g., network mapping details) for the example application 116. In the illustrated example, the application deployer 106 displays the application deployer GUI 400 at deployment time based on the example deployment profile 120 of FIG. 1 generated by the example deployment profile generator 104. To define mappings between logical templates and physical templates, the example application deployer GUI 400 is provided with a virtual machine templates display area 402 showing logical templates 404 and physical templates 406 (e.g., cloud templates). To define network mapping details, the example application deployer GUI 400 is provided with a networking display area 408.

In the illustrated example of FIG. 4, the logical templates 404 enable the example application provisioning manager 100 of FIG. 1 to define an application topology in a cloud-agnostic manner. A logical template may specify virtual computing resources for a virtual machine, such as CPU, memory, networking, storage, guest operating system, pre-installed installed runtime environments (e.g., Java Runtime Environment), and application services and commands (e.g., ssh, wget). For example, one logical template may specify a virtual machine having a guest operating system CentOS version 5.6 supporting 32-bit architecture, while another logical template may specify a virtual machine having Red Hat Enterprise Linux 6.1 supporting 64-bit architecture. In some examples, the administrator 124 (FIG. 1) specifies a name, description, and descriptive metadata for each logical template. In some examples, descriptive metadata such as non-hierarchical keywords or "tags" are used to organize listings of logical templates and enhance readability of logical templates during blueprint creation. For example, the administrator 124 may tag a logical template as a "Database Servers" tag and/or an "OS Templates" tag. Because some application nodes may not run on all operating systems, the administrator 124 may use descriptive metadata to label operating systems installed and supported by the logical templates. Such "operating system tags" provide system compatibility metadata that may be used to later limit which application nodes can be added to a logical template. For example, if the administrator 124 specifies a logical template having Ubuntu OS installed, example application provisioning manager 100 of FIG. 1 may prevent the developer 130 (FIG. 1) from later attempting to add a software service that does not run on Ubuntu onto this logical template.

In the illustrated example, the physical templates 406 are metadata that describes the physical configuration of a virtual machine, including CPU, memory, network, storage, guest operating system, and other supporting libraries pre-installed and used to repeatedly create a VM having the specified settings. Physical templates 406 that are made available by a cloud provider (e.g., one or more cloud providers of the deployment environments 118a, 118b of FIG. 1) are sometimes referred to as "cloud templates."

In the illustrated example of FIG. 4, a user (e.g., the developer 130) may interact with the VM templates display area 402 to select physical templates 406 to map to the logical templates 404 for the nodes 110, 112, 114. Also in the illustrated example of FIG. 4, the user may interact with the networking display area 408 to specify network details (e.g., cloud network name) for mapping to the nodes 110, 112, 114. For example, a user may customize ones of the nodes 110, 112, 114 by defining multiple network interfaces, sometimes referred to as "NICs," to separate data communication with the node into separated sub-networks. For a given one of the nodes 110, 112, 114, the user may specify more than one NIC, each NIC having a logical network name (e.g., "MgmtNetwork," "ServiceNetwork"). At deployment time, the example application deployer 106 maps the named logical network to an actual cloud network provided by a cloud provider. For example, the example load balancer node 110 may be specified to be the only node that may be accessed from a public network (e.g., Internet), and the example appserver node 112 and the example database node 114 may be deployed in a private network. In the illustrated example, since the example nodes 110, 112, 114 belong to the same example application 116, the load balancer node 110 should be able to access the appserver node 112 and the database node 114. As such, a user may specify, via the example application deployer GUI 400, that the load balancer node 110 should be allocated two NICs (e.g., a first NIC pointing to a "service" network and a second NIC pointing to a "management" network). The user may also specify that the example application deployer GUI 400 that each of the appserver node 112 and the database node 114 is allocated a single corresponding NIC pointing to the service network. At deployment time, the user may specify via the example application deployer GUI 400 that a service network be mapped to a private cloud network (e.g., the example deployment environment B 118*b* of FIG. 1) protected by a firewall and may specify the management network be mapped to a public cloud network (e.g., the example deployment environment A 118*a* of FIG. 1).

After the example application deployer 106 of FIG. 1 has defined the network configuration details (e.g., network mapping details) for the example application 116 based on user-input received via the example application deployer GUI 400, the example application deployer 106 deploys the nodes 110, 112, 114 of the example application 116 based on the network configuration details. In the illustrated example of FIG. 1, the example application deployer 106 deploys the load balancer node 110, the appserver node 112, and the database node 114 across the example deployment environments 118*a* and 118*b* of FIG. 1.

FIG. 5 depicts an example listing of programming instructions 500 that may be used to generate machine readable instructions executable by a computer to generate a blueprint table for the example blueprint 108 of FIG. 1. The blueprint table of the example blueprint 108 is used by the blueprint editor 102 of FIG. 1 to display the blueprint 108 of the application 116 in the example blueprint editor GUI 200 of FIG. 2. As such, the example programming instructions 500 are provided to enable the blueprint editor 102 to display the blueprint 108 in the example blueprint editor GUI 200. As discussed above in connection with FIG. 2, the example blueprint editor 102 displays the user-selectable 'Same Environment' GUI control 202 of FIG. 2 in the example blueprint editor GUI 200 to enable a user to select whether all of the example nodes 110, 112, 114 of the example application 116 are to be deployed in the same deployment environment or across multiple deployment environments. In the illustrated example of FIG. 5, to enable the blueprint editor 102 to store a value corresponding to the user-selectable 'Same Environment' GUI control 202, the example programming instructions 500 are provided with a same_environment boolean variable initialization instruction 502 to create a same_environment boolean variable to store the value (e.g., selected (same_environment=true) or not selected (same_environment=false)) of the user-selectable 'Same Environment' GUI control 202. In this manner, the blueprint editor 102 can determine whether the application 116 is to be deployed in a single deployment environment or across multiple deployment environments based on whether the value in the same_environment variable initialized by the same_environment variable initialization instruction 502 indicates that a user selected or did not select the user-selectable 'Same Environment' GUI control 202.

FIG. 6 depicts an example listing of programming instructions 600 that may be used to generate machine readable instructions executable by a computer to store deployment environment details for the example deployment profile 120 of FIG. 1. In the illustrated example, the programming instructions 600 are provided to enable the application deployer 106 to define the network configuration details discussed above in connection with FIG. 4 for use in deploying the application 116 across multiple deployment environments (e.g., the deployment environments 118*a* and 118*b* of FIG. 1). In the illustrated example, the programming instructions 600 are provided with a deployment_environment_id integer variable initialization instruction 602 to create a variable to store the network mapping details defined based on user-input received via the example application deployer GUI 400 of FIG. 4. At runtime (e.g., a runtime phase), when the deployment of the example application 116 is scheduled, the example CAL module 131 (FIG. 1) of the application deployer 106 accesses the deployment_profile_pnode table generated using the example programming instructions 600 to retrieve information about the deployment environment for each of the example nodes 110, 112, 114 in the example application blueprint 108. The example CAL module 131 of the example application deployer 106 then communicates the information to specified cloud environments (e.g., the deployment environments 118*a*, 118*b*) to provision VMs that will host the nodes 110, 112, 114. In this manner, the nodes 110, 112, 114 can be deployed across multiple deployment environments.

Figure 7:
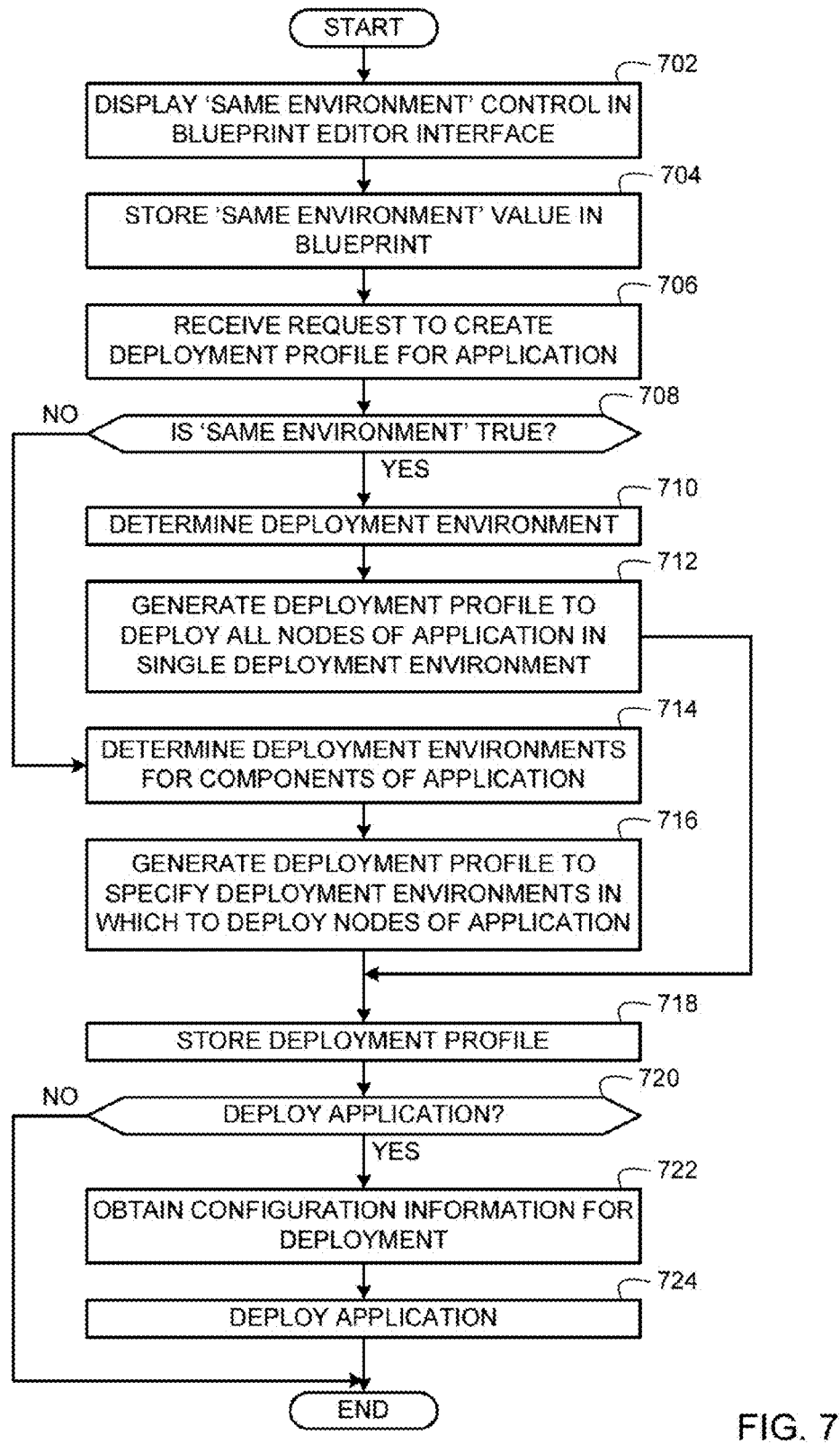
FIG. 7 is a flow diagram representative of example machine readable instructions that may be executed to implement the example application provisioning manager of FIG. 1 to deploy nodes of an application across multiple deployment environments.

A flowchart representative of example machine readable instructions for implementing the application provisioning manager 100 of FIG. 1 is shown in FIG. 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example application provisioning manager 100 may alternatively be used. For example, the order of execution of the blocks may be changed, and/or some of the blocks described may be changed, eliminated, or combined.

As mentioned above, the example process of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program of FIG. 7 begins at block 702 at which the example blueprint editor 102 (FIG. 1) displays the user-selectable 'Same Environment' GUI control 202 in the example blueprint editor GUI 200 (block 702). The example blueprint editor 102 stores a 'same environment' value in the example blueprint 108 of FIG. 1 (block 704). For example, the example blueprint editor 102 may access the 'same environment' value stored in the same_environment boolean variable initialized based on the same_environment boolean variable initialization instruction 502 of FIG. 5, and store the 'same environment' value in the example blueprint 108. As discussed above, the value in the same_environment boolean variable indicates whether the user-selectable 'Same Environment' GUI control 202 is selected (e.g., same_environment=true) or not selected (e.g., same_environment=false) to specify whether the nodes 110, 112, 114 of the example application 116 are to be deployed in a single deployment environment or across multiple deployment environments (e.g., across the deployment environments 118a, 118b of FIG. 1).

The example deployment profile generator 104 receives a request to create the example deployment profile 120 of FIG. 1 (block 706). For example, the example deployment profile generator 104 may receive user input indicative of a user's desire to create the example deployment profile 120. Based on the received request, the example deployment profile generator 104 determines whether the 'same environment' value is true (block 708). For example, the 'same environment' value is true when a user selects the user-selectable 'Same Environment' GUI control 202 of FIG. 2 to indicate that the application 116 is to be deployed in a single deployment environment. When the 'same environment' value is false, a user has not selected the user-selectable 'Same Environment' GUI control 202 of FIG. 2, which indicates that the application 116 is to be deployed across multiple deployment environments (e.g., the deployment environments 118a, 118b).

If the 'same environment' value is true (block 708), the example deployment profile generator 104 determines the deployment environment in which the application 116 is to be deployed (block 710). For example, the application 116 can be entirely deployed in the example deployment environment 118a or entirely deployed in the example deployment environment 118b. The example deployment profile generator 104 generates the deployment profile 120 of FIG. 1 with a configuration to deploy all the nodes 110, 112, 114 of the application 116 in a single deployment environment (block 712). Control then advances to block 718.

If the 'same environment' value is false (block 708), control advances to block 714 at which the example deployment profile generator 104 determines the deployment environments across which the nodes 110, 112, 114 of the application 116 are to be deployed. For example, the example deployment profile generator 104 may receive user-selected deployment environments from the deployment profile generator GUI 300 of FIG. 3 that specify corresponding deployment environments for the nodes 110, 112, 114. The example deployment profile generator 104 generates the deployment profile 120 with configuration information specifying different deployment environments in which to deploy the nodes 110, 112, 114 of the application 116 (block 716). For example, the deployment profile generator 104 binds different user-specified deployment environments at a node-level to different ones of the nodes 110, 112, 114 in the deployment profile 120 so that the nodes 110, 112, 114 can be deployed in corresponding ones of the specified deployment environments at a deployment time of the application 116. For example, to bind different deployment environments to different ones of the nodes 110, 112, 114, the deployment environment generator 104 can store identifiers of the different deployment environments in corresponding deployment environment property values of the nodes 110, 112, 114. The example deployment profile generator 104 stores the deployment profile 120 in the example profile repository 122 of FIG. 1 (block 718). In this manner, the application deployer 106 of FIG. 1 can subsequently retrieve the deployment profile 120 at a deployment time to deploy the application 116 across the deployment environments 118a, 118b.

The application deployer 106 determines whether it should deploy the application 116 (block 720). For example, the application deployer 106 may determine whether it has received a user-submitted request to deploy the application 116, or whether a scheduled time to deploy the application 116 has arrived. For example, a user-submitted request may initiate a deployment time instantly or at some future time at which the application deployer 106 is to deploy the application 116.

When the application deployer 106 determines that it should deploy the application 116 (block 720), the application deployer 106 obtains configuration information for deployment (block 722). In the illustrated example, to obtain configuration information for deployment, the application deployer 106 displays the application deployer GUI 400 at the deployment time determined at block 720 based on the example deployment profile 120 of FIG. 1. The example CAL module 131 of the application deployer 106 accesses the deployment_profile_pnode table generated using the example programming instructions 600 of FIG. 6 to obtain information about the deployment environment for each of the nodes 110, 112, 114 in the application blueprint 108. For example, the CAL module 131 of the example application deployer GUI 400 obtains mappings between logical templates 404 (FIG. 4) and physical templates 406 (FIG. 4) as specified in the VM templates display area 402 (FIG. 4). In addition, the CAL module 131 of the example application deployer GUI 400 obtains network mapping details as specified in the networking display area 408 (FIG. 4). In this manner, the application deployer 106 has the deployment configuration information needed for it to send to specified cloud environments (e.g., the deployment environments 118a, 118b) to provision VMs (e.g., the VMs, 126, 128 of FIG. 1) that will host the nodes 110, 112, 114 of the application 116.

In the illustrated example, the application deployer 106 deploys the application 116 (block 724) to the deployment environments 118a, 118b based on, for example, one or more of the application blueprint 108, the deployment profile 120, and the configuration information obtained at block 722. After the application 116 is deployed at block 724, or if the application deployer 106 determines that the application 116 is not to be deployed at block 720, the example process of FIG. 7 ends. In some examples, the application deployer 106 may, from time to time, monitor whether to deploy the application 116 (block 720) so that when a user submits a request to deploy the application 116 or a scheduled time arrives at which the application 116 is to be deployed, control can advance to block 722 so that the application deployer 106 can deploy the application 116.

Figure 8:
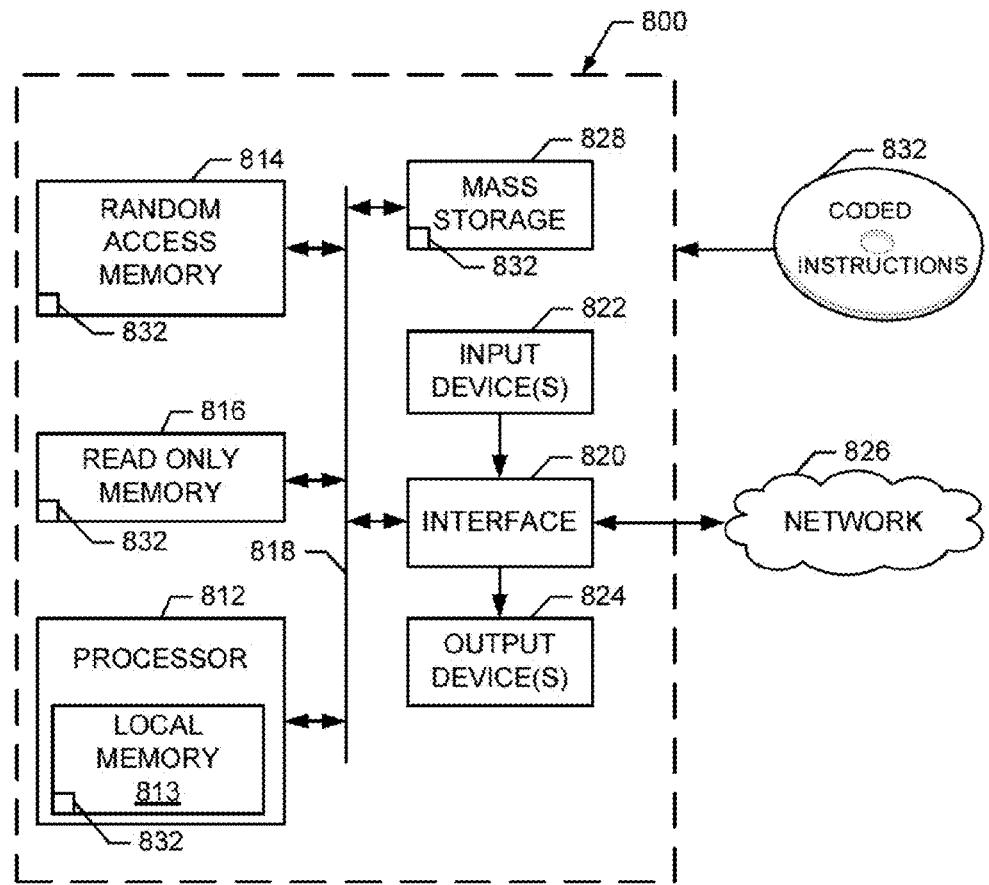
FIG. 8 is a block diagram of an example processor system that may be used to implement the example application provisioning manager of FIG. 1.

FIG. 8 is a block diagram of an example processor platform 800 capable of executing the instructions of FIG. 7 to implement the example application provisioning manager 100 of FIG. 1. The processor platform 800 can be, for example, a server, a personal computer, or any other type of suitable computing device. The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Example coded instructions 832 of the illustrated example include the example machine readable instructions of FIG. 7. The example coded instructions 832 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable configuring application blueprints of cloud-deployable applications to indicate when applications are to be deployed across multiple deployment environments. In this manner, application deployment profiles need not be limited to configurations in which an application is only deployable in its entirety in a single deployment environment. That is, examples disclosed herein provide users the flexibility of selecting what applications are to be deployed across multiple deployment environments and what applications are to be deployed in a single deployment environment so that deployment profiles can be generated to specify different deployment environments across which to deploy different nodes of an application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to configure an application for deployment across separate cloud providers, the method comprising:
   displaying, by executing a first instruction with a processor, a user-selectable control in a user interface, the user-selectable control to specify whether different components of the application are to be deployed in the separate cloud providers;
   based on selection of the user-selectable control, storing, in a blueprint of the application, an indication of whether the different components of the application are to be deployed in the separate cloud providers; and
   based on the indication in the blueprint, generating, by executing a second instruction with the processor, an application deployment profile to specify the separate cloud providers in which to deploy the different components of the application.

2. A method as defined in claim 1, further including storing the application deployment profile in a memory, the application deployment profile to be deployed at a deployment time to deploy the different components of the application in the separate cloud providers.

3. A method as defined in claim 1, wherein the different components of the application include a first node of the application and a second node of the application, and the application deployment profile is to specify the separate cloud providers across which to deploy the application by specifying that the first node of the application is to be deployed in a first one of the separate cloud providers and that the second node of the application is to be deployed in a second one of the separate cloud providers.

4. A method as defined in claim 1, further including, at a deployment time:
   obtaining configuration information to provision virtual machines in the separate cloud providers in which the different components of the application are to be deployed; and
   deploying the application across the separate cloud providers based on the application deployment profile and the configuration information.

5. A method as defined in claim 4, wherein the configuration information includes a mapping between a logical template and a physical template, the logical template to specify a virtual computing resource for one of the virtual machines, and the physical template to include metadata that describes a physical configuration of the one of the virtual machines.

6. A method as defined in claim 1, wherein the displaying of the user-selectable control in the user interface includes displaying the user-selectable control in association with the blueprint of the application.

7. A method as defined in claim 1, wherein the different components of the application include a first node of the application and a second node of the application, and the application deployment profile is to indicate that the first node of the application is to be deployed in a public network of one of the separate cloud providers, and the second node of the application is to be deployed in a private network of another one of the separate cloud providers.

8. An apparatus to configure an application for deployment across separate cloud providers, the apparatus comprising:
 a blueprint editor to:
  display a user-selectable control in a user interface, the user-selectable control to specify whether different components of the application are to be deployed in the separate cloud providers; and
  based on selection of the user-selectable control, store, in a blueprint of the application, an indication of whether the different components of the application are to be deployed in the separate cloud providers;
 a deployment profile generator to, based on the indication in the blueprint, generate an application deployment profile to specify the separate cloud providers in which to deploy the different components of the application;
 a memory; and
 a processor to execute at least one of the blueprint editor or the deployment profile generator based on machine readable instructions on the memory.

9. An apparatus as defined in claim 8, wherein the different components of the application include a first node of the application and a second node of the application, and the application deployment profile to specify the separate cloud providers across which to deploy the application by specifying that the first node of the application is to be deployed in a first one of the separate cloud providers and that the second node of the application is to be deployed in a second one of the separate cloud providers.

10. An apparatus as defined in claim 8, further including an application deployer to, at a deployment time:
 obtain configuration information to provision virtual machines in the separate cloud providers across which the application is to be deployed; and
 deploy the application across the separate cloud providers based on the application deployment profile and the configuration information.

11. An apparatus as defined in claim 10, wherein the configuration information includes a mapping between a logical template and a physical template, the logical template to specify a virtual computing resource for one of the virtual machines, and the physical template to include metadata that describes a physical configuration of the one of the virtual machines.

12. An apparatus as defined in claim 8, wherein the blueprint editor is to display the user-selectable control in the user interface in association with the blueprint of the application.

13. An apparatus as defined in claim 8, wherein the different components of the application include a first node of the application and a second node of the application, and the application deployment profile is to indicate that the first node of the application is to be deployed in a public network of one of the separate cloud providers, and the second node of the application is to be deployed in a private network of another one of the separate cloud providers.

14. A tangible computer readable storage medium comprising instructions that, when executed, cause a processor to at least:
 display a user-selectable control in a user interface, the user-selectable control to specify whether different components of an application are to be deployed in separate cloud providers;
 based on selection of the user-selectable control, store, in a blueprint of the application, an indication of whether the different components of the application are to be deployed in the separate cloud providers; and
 based on the indication in the blueprint, generate an application deployment profile to specify the separate cloud providers in which to deploy the different components of the application.

15. A tangible computer readable storage medium as defined in claim 14, wherein the different components of the application include a first node of the application and a second node of the application, and the application deployment profile is to specify the separate cloud providers across which to deploy the application by specifying that the first node of the application is to be deployed in a first one of the separate cloud providers and that the second node of the application is to be deployed in a second one of the separate cloud providers.

16. A tangible computer readable storage medium as defined in claim 14, wherein the instructions further cause the processor to, at a deployment time:
 obtain configuration information to provision virtual machines in the separate cloud providers across which the application is to be deployed; and
 deploy the application across the separate cloud providers based on the application deployment profile and the configuration information.

17. A tangible computer readable storage medium as defined in claim 16, wherein the configuration information includes a mapping between a logical template and a physical template, the logical template to specify a virtual computing resource for one of the virtual machines, and the physical template to include metadata that describes a physical configuration of the one of the virtual machines.

18. A tangible computer readable storage medium as defined in claim 14, wherein the instructions cause the processor to display the user-selectable control in the user interface in association with the blueprint of the application.

19. A tangible computer readable storage medium as defined in claim 14, wherein the different components of the application include a first node of the application and a second node of the application, and the application deployment profile is to indicate that the first node of the application is to be deployed in a public network of one of the separate cloud providers, and the second node of the application is to be deployed in a private network of another one of the separate cloud providers.

20. A tangible computer readable storage medium as defined in claim 14, wherein the instructions further cause the processor to store the application deployment profile in a memory, the application deployment profile to be employed at a deployment time to deploy the different components of the application in the separate cloud providers.

21. A method as defined in claim 1, wherein the user interface is a blueprint editor graphical user interface, a selected state and an unselected state of the user-selectable control to distinguish between whether the different components of the application are to be deployed in a same cloud provider and whether the different components of the application are to be deployed in the separate cloud providers.

22. An apparatus as defined in claim 8, wherein a selected state and an unselected state of the user-selectable control are to distinguish between whether the different components of the application are to be deployed in a same cloud provider and whether the different components of the application are to be deployed in the separate cloud providers.

23. A tangible computer readable storage medium as defined in claim 14, wherein the user interface is a blueprint editor graphical user interface, a selected state and an unselected state of the user-selectable control to distinguish between whether the different components of the application are to be deployed in a same cloud provider and whether the different components of the application are to be deployed in the separate cloud providers.

* * * * *